US010783883B2

(12) United States Patent
Mixter et al.

(10) Patent No.: US 10,783,883 B2
(45) Date of Patent: Sep. 22, 2020

(54) FOCUS SESSION AT A VOICE INTERFACE DEVICE

(71) Applicant: GOOGLE LLC, Mountain View, CA (US)

(72) Inventors: Kenneth Mixter, Los Altos Hills, CA (US); Tomer Shekel, San Francisco, CA (US); Tuan Anh Nguyen, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/801,307

(22) Filed: Nov. 1, 2017

(65) Prior Publication Data
US 2018/0122378 A1 May 3, 2018

Related U.S. Application Data

(60) Provisional application No. 62/417,281, filed on Nov. 3, 2016.

(51) Int. Cl.
*G10L 15/18* (2013.01)
*G06F 17/21* (2006.01)
(Continued)

(52) U.S. Cl.
CPC ............. *G10L 15/22* (2013.01); *G06F 3/167* (2013.01); *H04L 12/282* (2013.01);
(Continued)

(58) Field of Classification Search
None
See application file for complete search history.

(56) References Cited

U.S. PATENT DOCUMENTS 6,052,666 A 4/2000 Diehl
8,340,975 B1 * 12/2012 Rosenberger ........... G10L 15/22
704/270
(Continued)

FOREIGN PATENT DOCUMENTS

EP 2930715 A1 10/2015

OTHER PUBLICATIONS

Google LLC, International Search Report/Written Opinion, PCT/US2017/059955, dated Apr. 17, 2018, 11 pgs.
(Continued)

*Primary Examiner* — Seong-Ah A Shin
(74) *Attorney, Agent, or Firm* — Morgan, Lewis & Bockius LLP

(57) ABSTRACT

A method at a first electronic device of a local group of connected electronic devices includes: receiving a first voice command including a request for a first operation; determining a first target device for the first operation from among the local group; establishing a focus session with respect to the first target device; causing the first operation to be performed by the first target device; receiving a second voice command including a request for a second operation; determining that the second voice command does not include an explicit designation of a second target device; determining that the second operation can be performed by the first target device; determining whether the second voice command satisfies one or more focus session maintenance criteria; and if the second voice command satisfies the focus session maintenance criteria, causing the second operation to be performed by the first target device.

20 Claims, 7 Drawing Sheets

(51) Int. Cl.
*G10L 15/22* (2006.01)
*G06F 3/16* (2006.01)
*H04L 12/28* (2006.01)
*H04L 29/08* (2006.01)
*H04N 21/472* (2011.01)

(52) U.S. Cl.
CPC ..... H04L 67/306 (2013.01); H04N 21/47217 (2013.01); *G10L 2015/223* (2013.01); *G10L 2015/228* (2013.01)

(56) References Cited

U.S. PATENT DOCUMENTS

| | | | | |
|---|---|---|---|---|
| 8,768,712 | B1* | 7/2014 | Sharifi | G10L 25/51 |
| | | | | 704/275 |
| 9,318,107 | B1* | 4/2016 | Sharifi | G10L 17/22 |
| 9,431,014 | B2* | 8/2016 | Wait | G10L 15/26 |
| 9,431,021 | B1* | 8/2016 | Scalise | G10L 21/00 |
| 9,785,247 | B1* | 10/2017 | Horowitz | H04N 13/296 |
| 9,792,901 | B1* | 10/2017 | Saleem | G10L 15/22 |
| 10,102,855 | B1* | 10/2018 | Sindhwani | G10L 15/22 |
| 10,192,546 | B1* | 1/2019 | Piersol | G10L 15/08 |
| 2009/0299745 | A1* | 12/2009 | Kennewick | G10L 15/22 |
| | | | | 704/257 |
| 2015/0287411 | A1* | 10/2015 | Kojima | G10L 17/22 |
| | | | | 704/246 |
| 2015/0346701 | A1* | 12/2015 | Gordon | H04L 12/2809 |
| | | | | 700/275 |
| 2016/0226823 | A1* | 8/2016 | Ansari | G06F 16/64 |
| 2017/0004828 | A1* | 1/2017 | Lee | G10L 15/25 |
| 2017/0103756 | A1* | 4/2017 | Kobayashi | G10L 15/30 |
| 2017/0236512 | A1* | 8/2017 | Williams | G06F 40/40 |
| | | | | 381/79 |
| 2018/0122378 | A1* | 5/2018 | Mixter | H04L 67/306 |
| 2018/0165099 | A1* | 6/2018 | Nagasaka | G06F 13/00 |
| 2018/0196782 | A1* | 7/2018 | Gray | G06F 3/0482 |

OTHER PUBLICATIONS

Anonymous: "Google Home-Wikipedia", Oct. 19, 2016 (Oct. 19, 2016), pp. 1-3, XP055465187, Retreived from the Internet: URL: https://web.archive.org/web/20161019012254/https://en.wikipedia.org/wiki/Google_Home (retrieved on Apr. 6, 2018).

* cited by examiner

500

At a first electronic device with one or more microphones, a speaker, one or more processors, and memory storing one or more programs for execution by the one or more processors, the first electronic device being a member of a local group of connected electronic devices communicatively coupled to a common network service Receive a first voice command including a request for a first operation — 502

Determine a first target device for the first operation from among the local group of connected electronic devices — 504

Establish a focus session with respect to the first target device — 506

Cause the first operation to be performed by the first target device via operation of the common network service — 508

Receive a second voice command including a request for a second operation — 510

Determine that the second voice command does not include an explicit designation of a second target device — 512

Determine that the second operation can be performed by the first target device — 514

Determine whether the second voice command satisfies one or more focus session maintenance criteria — 516

In accordance with a determination that the second voice command satisfies the focus session maintenance criteria, cause the second operation to be performed by the first target device via operation of the common network service — 518

Figure 5

FOCUS SESSION AT A VOICE INTERFACE DEVICE

RELATED APPLICATIONS

This application claims the benefit of U.S. Provisional Patent Application No. 62/417,281, entitled "Focus Session at a Voice Interface Device," filed on Nov. 3, 2016, which is incorporated by reference herein in its entirety.

This application is related to the following U.S. patent applications, which are incorporated by reference herein in their entirety:

U.S. patent application Ser. No. 15/592,137, entitled "Implementations for Voice Assistant on Devices," filed May 10, 2017, which claims the benefit of Provisional Patent Application No. 62/334,434, entitled "Implementations for Voice Assistant on Devices," filed May 10, 2016; U.S. Provisional Application No. 62/336,551, titled "Personalized and Contextualized Audio Briefing," filed May 13, 2016; U.S. Provisional Application No. 62/336,566, titled "LED Design Language for Visual Affordance of Voice User Interfaces," filed May 13, 2016; U.S. Provisional Application No. 62/336,569, titled "Voice-Controlled Closed Caption Display," filed May 13, 2016; U.S. Provisional Application No. 62/336,565, titled "Media Transfer among Media Output Devices," filed May 13, 2016; and U.S. patent application Ser. No. 15/592,120, entitled "LED Design Language for Visual Affordance of Voice User Interfaces," filed May 10, 2017, which claims the benefit of U.S. Provisional Patent Application No. 62/336,566, entitled "LED Design Language for Visual Affordance of Voice User Interfaces," filed May 13, 2016.

TECHNICAL FIELD

The disclosed implementations relate generally to voice interfaces and related devices, including but not limited methods and systems for directing a voice command to a target device when the target device is unknown or ambiguous from the voice command itself.

BACKGROUND

Electronic devices with voice interfaces have been widely used to collect voice inputs from users and perform different voice-activated functions according to the voice inputs. These voice-activated functions may include directing or commanding a target device to perform an operation. For example, the user may utter a voice input to a voice interface device to direct a target device to turn on or off, or to control media playback at the target device.

Typically, if a user wishes to make a voice input that directs a target device to perform an operation, the user would specify the target device in the voice input. However, having to explicitly specify the target device for all such voice inputs is tedious and burdensome to the user. It is desirable for a voice interface device to have a target device for a voice input even when the voice input does not specify a target or specifies an ambiguous target.

SUMMARY

Accordingly, there is a need for an electronic device with a voice assistant system and/or a voice assistant server system that incorporates methods and systems for determining or assigning a target device for a voice input when a specification of a target device in the voice input is absent or ambiguous. In various implementations described in this application, an operating environment includes a voice-activated electronic device that provides an interface to a voice assistant service, and multiple devices (e.g., cast device, smart home device) that may be controlled by voice input via the voice assistant service. The voice-activated electronic device is configured to record a voice input from which the voice assistance service (e.g., a voice assistance server system) determines a user voice request (e.g., a media playback request, a power state change request). The voice assistance server system then directs the user voice request to a target device as indicated by the voice input. The voice-activated electronic device is configured to record a subsequent voice input, in which an indication of a target device is absent or ambiguous. The electronic device or the voice assistance server system assigns a target device for this voice input, determines a user voice request included in this voice input, and directs the user voice request to the assigned target device.

In accordance with some implementations, a method is performed at a first electronic device with one or more microphones, a speaker, one or more processors, and memory storing one or more programs for execution by the one or more processors. The first electronic device is a member of a local group of connected electronic devices communicatively coupled to a common network service. The method includes: receiving a first voice command including a request for a first operation; determining a first target device for the first operation from among the local group of connected electronic devices; establishing a focus session with respect to the first target device; causing the first operation to be performed by the first target device via operation of the common network service; receiving a second voice command including a request for a second operation; determining that the second voice command does not include an explicit designation of a second target device; determining that the second operation can be performed by the first target device; determining whether the second voice command satisfies one or more focus session maintenance criteria; and in accordance with a determination that the second voice command satisfies the focus session maintenance criteria, causing the second operation to be performed by the first target device via operation of the common network service.

In accordance with some implementations, an electronic device includes one or more microphones, a speaker, one or more processors, and memory storing one or more programs to be executed by the one or more processors. The one or more programs include instructions for performing the method described above.

In accordance with some implementations, a non-transitory computer readable storage medium stores one or more programs. The one or more programs include instructions, which, when executed by an electronic device with one or more microphones, a speaker, and one or more processors, cause the electronic device to perform operations of the method described above.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 5 illustrates a flow diagram of an example process of establishing a focus session and responding to voice inputs in accordance with a focus session, in accordance with some implementations.

Like reference numerals refer to corresponding parts throughout the several views of the drawings.

DESCRIPTION OF IMPLEMENTATIONS

Figure 1:
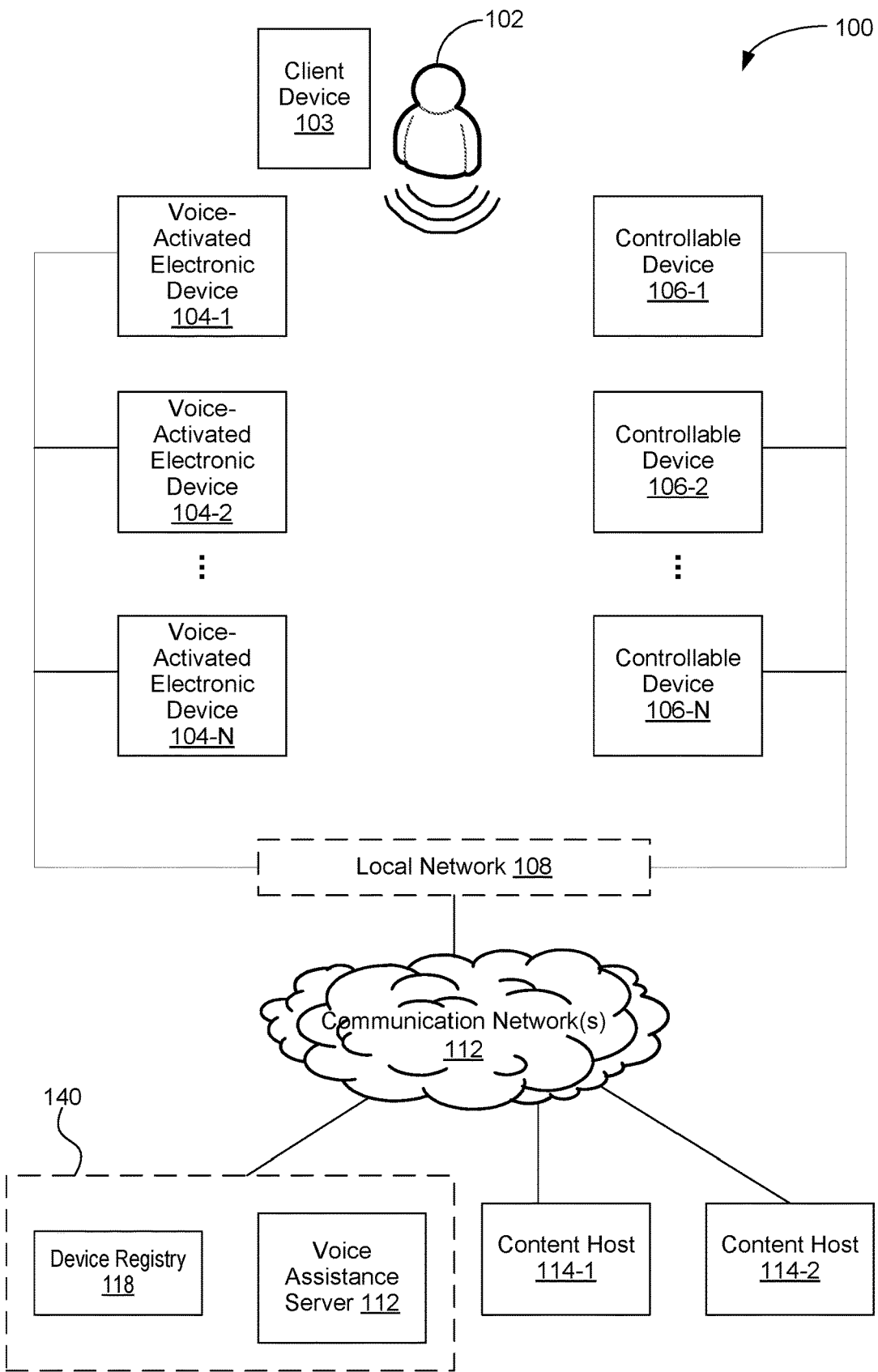
FIG. 1 illustrates an example operating environment in accordance with some implementations.

While the digital revolution has provided many benefits ranging from openly sharing information to a sense of global community, emerging new technology often induces confusion, skepticism and fear among consumers, preventing consumers from benefiting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at the electronic device can carry instructions and information even if a user's line of sight is obscured and his hands are full. To enable a hands-free and eyes-free experience, the voice-activated electronic device listens to the ambient (i.e., constantly processes audio signals collected from the ambient) constantly or only when triggered. On the other hand, user identities are linked with a user's voice and a language used by the user. To protect the user identities, these voice-activated electronic devices are normally used in non-public places that are protected, controlled and intimate spaces (e.g., home and car).

In accordance with some implementations, a voice-activated electronic device determines or assigns a target device to a request made in a voice command when an indication of a target device in the voice command is absent or ambiguous. The voice-activated electronic device establishes focus sessions with respect to a target device explicitly specified or indicated in a voice command. When the voice-activated electronic device receives a subsequent voice command in which a specification or indication of a target device is absent or ambiguous, the electronic device assigns the target device of the focus session to the voice command if the voice command satisfies one or more criteria.

In some implementations, when the user talks to a voice interface device to control another device, the voice interface device stores which device was being targeted by the user (e.g., in a focus session). For a period after that, the default target device for control is the stored device. For example, if the user first utters a voice command "turn on the kitchen light," and then utters "turn off the light," the target device for the second voice command defaults to "kitchen light" if the second command is received shortly after the first command. As another example, if the first command is "play music on living room speakers," and the subsequent command is "stop music," the target device for the second voice command defaults to "living room speakers" if the second command is received shortly after the first command.

Additionally, in some implementations, the user may be asked to confirm or verify that the last used target device is the intended target device, if there is a longer time gap between voice inputs. For example, if the first voice command is "play music on living room speakers," and the subsequent command, receiving after a longer time gap from the first voice command, is "stop music," the voice interface device may ask the user "do you want to stop the music on the living room speakers?" to confirm that the target device is "living room speakers."

In this way, the user may be spared the burden of having to specify the full context of his request in each and every voice input (e.g., spared from having to include a specification of a target device in each and every voice input requesting an operation to be performed).

Voice Assistant Operating Environment

FIG. 1 is an example operating environment in accordance with some implementations. Operating environment 100 includes one or more voice-activated electronic devices 104 (e.g., voice-activated electronic devices 104-1 thru 104-N, hereinafter "voice-activated device(s)"). The one or more voice-activated devices 104 may be located in one or more locations (e.g., all in a room or space of a structure, spread out throughout multiple spaces within a structure or throughout multiple structures (e.g., one in a house and one in the user's car)).

The environment 100 also includes one or more controllable electronic devices 106 (e.g., electronic device 106-1 thru 106-N, hereinafter "controllable device(s)"). Examples of controllable devices 106 include media devices (smart televisions, speaker systems, wireless speakers, set-top boxes, media streaming devices, cast devices), and smart home devices (e.g., smart camera, smart thermostat, smart light, smart hazard detector, smart door lock).

The voice-activated devices 104 and the controllable devices 106 are communicatively coupled, through communication networks 110, to a voice assistant service 140 (e.g., to a voice assistance server system 112 of the voice assistant service 140). In some implementations, one or more of the voice-activated devices 104 and the controllable devices 106 are communicatively coupled to a local network 108, which is communicatively coupled to the communication networks 110; the voice-activated device(s) 104 and/or the controllable device(s) 106 are communicatively coupled to communication network(s) 110 (and, through the communication networks 110, to the voice assistance server system 112) via the local network 108. In some implementations, the local network 108 is a local area network implemented at a network interface (e.g., a router). The voice-activated devices 104 and the controllable devices 106 that are communicatively coupled to the local network 108 may also communicate with each other through the local network 108.

Optionally, one or more of the voice-activated devices 104 are communicatively coupled to the communication networks 110 and are not on the local network 108. For example, these voice-activated devices are not on the Wi-Fi network corresponding to the local network 108 but are connected to the communication networks 110 through a cellular connection. In some implementations, communication between voice-activated devices 104 that are on the local network 108 and voice-activated devices 104 that are not on the local network 108 are done through the voice assistance server system 112. The voice-activated devices 104 (whether on the local network 108 or on the network 110) are registered in a device registry 118 of the voice assistant service 140 and thus known to the voice assistance server system 112. Similarly, the voice-activated devices 104 that are not on the local network 108 may communicate with controllable devices 106 through the voice assistant server system 112. The controllable devices 106 (whether on the local network 108 or on the network 110) are also registered in the device registry 118. In some implementations, communications between the voice-activated devices 104 and the controllable devices 106 go through the voice assistance server system 112.

In some implementations, the environment 100 also includes one or more content hosts 114. A content host 114 may be a remote content source from which content is streamed or otherwise obtained in accordance with a request included in a user voice input or command. A content host 114 may be an information source from which the voice assistance server system 112 retrieves information in accordance with a user voice request.

In some implementations, controllable devices 106 are capable of receiving commands or requests to perform specified operations or to transition to specified states (e.g., from a voice-activated device 104 and/or the voice assistance server system 112) and to perform the operations or transition states in accordance with the received commands or requests.

In some implementations, one or more of the controllable devices 106 are media devices that are disposed in the operating environment 100 to provide to one or more users media content, news and/or other information. In some implementations, the content provided by the media devices is stored at a local content source, streamed from a remote content source (e.g., content host(s) 114), or generated locally (e.g., through a local text to voice processor that reads a customized news briefing, emails, texts, a local weather report, etc. to one or more occupants of the operating environment 100). In some implementations, the media devices include media output devices that directly output the media content to an audience (e.g., one or more users), and cast devices that are networked to stream media content to the media output devices. Examples of the media output devices include, but are not limited to television (TV) display devices and music players. Examples of the cast devices include, but are not limited to, set-top boxes (STBs), DVD players, TV boxes, and media streaming devices, such as Google's Chromecast™ media streaming device.

In some implementations, a controllable device 106 is also a voice-activated device 104. In some implementations, a voice-activated device 104 is also a controllable device 106. For example, a controllable device 106 may include a voice interface to the voice assistance service 140 (e.g., a media device that can also receive, process, and respond to user voice inputs). As another example, a voice-activated device 104 may also perform particular operations and transition to particular states in accordance with requests or commands in voice inputs (e.g., a voice interface device that can also play streaming music).

In some implementations, the voice-activated devices 104 and the controllable deices 106 are associated with a user having a respective account, or with multiple users (e.g., a group of related users, such as users in a family or in an organization; more generally, a primary user and one or more authorized additional users) having respective user accounts, in a user domain. A user may make voice inputs or voice commands to the voice-activated device 104. The voice-activated device 104 receives these voice inputs from the user (e.g., user 102), and the voice-activated device 104 and/or the voice assistance server system 112 proceeds to determine a request in the voice input and generate a response to the request.

In some implementations, the request included in a voice input is a command or request to a controllable device 106 to perform an operation (e.g., play media, pause media, fast forward or rewind media, change volume, change screen brightness, change light brightness) or transition to another state (e.g., change the mode of operation, turn on or off, go into sleep mode or wake from sleep mode).

In some implementations, a voice-activated electronic device 104 responds to voice inputs by: generating and providing a spoken response to a voice command (e.g., speaking the current time in response to the question, "what time is it?"); streaming media content requested by a user (e.g., "play a Beach Boys song"); reading a news story or a daily news briefing prepared for the user; playing a media item stored on the personal assistant device or on the local network; changing a state or operating one or more other connected devices within the operating environment 100 (e.g., turning lights, appliances or media devices on/off, locking/unlocking a lock, opening windows, etc.); or issuing a corresponding request to a server via a network 110.

In some implementations, the one or more voice-activated devices 104 are disposed in the operating environment 100 to collect audio inputs for initiating various functions (e.g., media play functions of the media devices). In some implementations, these voice-activated devices 104 (e.g., devices 104-1 thru 104-N) are disposed in proximity to a controllable device 104 (e.g., a media device), for example, in the same room with the cast devices and the media output devices. Alternatively, in some implementations, a voice-activated device 104 is disposed in a structure having one or more smart home devices but not any media device. Alternatively, in some implementations, a voice-activated device 104 is disposed in a structure having one or more smart home devices and one or more media devices. Alternatively, in some implementations, a voice-activated device 104 is disposed in a location having no networked electronic device. Further, in some implementations, a room or space in the structure may have multiple voice-activated devices 104.

In some implementations, the voice-activated device 104 includes at least one or more microphones, a speaker, a processor and memory storing at least one program for execution by the processor. The speaker is configured to allow the voice-activated device 104 to deliver voice messages and other audio (e.g., audible tones) to a location where the voice-activated device 104 is located in the operating environment 100, thereby broadcasting music, reporting a state of audio input processing, having a conversation with or giving instructions to a user of the voice-activated device 104. As an alternative to the voice messages, visual signals could also be used to provide feedback to the user of the voice-activated device 104 concerning the state of audio input processing. When the voice-activated device 104 is a mobile device (e.g., a mobile phone or a tablet computer), its display screen is configured to display a notification concerning the state of audio input processing.

In some implementations, the voice-activated device 104 is a voice interface device that is network-connected to provide voice recognition functions with the aid of a voice assistance server system 112. For example, the voice-activated device 104 includes a smart speaker that provides music to a user and allows eyes-free and hands-free access to a voice assistant service (e.g., Google Assistant). Optionally, the voice-activated device 104 is one of a desktop or laptop computer, a tablet, a mobile phone that includes a microphone, a cast device that includes a microphone and optionally a speaker, an audio system (e.g., a stereo system, a speaker system, a portable speaker) that includes a microphone and a speaker, a television that includes a microphone and a speaker, and a user interface system in an automobile that includes a microphone and a speaker and optionally a display. Optionally, the voice-activated device 104 is a simple and low cost voice interface device. Generally, the voice-activated device 104 may be any device that is capable of network connection and that includes a microphone, a speaker, and programs, modules, and data for interacting with voice assistant service. Given simplicity and low cost of the voice-activated device 104, the voice-activated device 104 includes an array of light emitting diodes (LEDs) rather than a full display screen, and displays a visual pattern on the LEDs to indicate the state of audio input processing. In some implementations, the LEDs are full color LEDs, and the colors of the LEDs may be employed as a part of the visual pattern to be displayed on the LEDs. Multiple examples of using LEDs to display visual patterns in order to convey information or device status are described in U.S. Provisional Patent Application No. 62/336,566, entitled "LED Design Language for Visual Affordance of Voice User Interfaces," filed May 13, 2016, which is incorporated by reference in its entirety. In some implementations, visual patterns indicating the state of voice processing operations are displayed using characteristic images shown on conventional displays associated with voice-activated devices that are performing the voice processing operations.

In some implementations, LEDs or other visual displays are used to convey a collective voice processing state of multiple participating electronic devices. For example, in an operating environment where there are multiple voice processing or voice interface devices (e.g., multiple electronic devices 400 as shown in FIG. 4A of the '566 application; multiple voice-activated devices 104), groups of color LEDs (e.g., LEDs 404 as shown in FIG. 4A of the '566 application) associated with respective electronic devices can be used to convey which of the electronic devices is listening to a user, and which of the listening devices is the leader (where the "leader" device generally takes the lead in responding to a spoken request issued by the user).

More generally, the '566 application describes (e.g., see paras. [0087]-[0100]) a "LED Design Language" for indicating visually using a collection of LEDs a variety of voice processing states of an electronic device, such as a "Hot word detection state and listening state," a "Thinking mode or working mode," and a "Responding mode or speaking mode." In some implementations, unique states of voice processing operations described herein are represented using a group of LEDs in accordance with one or more aspects of the "LED Design Language" of the '566 application. These visual indicators can also be combined with one or more audible indicators generated by electronic devices that are performing voice processing operations. The resulting audio and/or visual indicators will enable users in a voice-interactive environment to understand the state of various voice processing electronic devices in the environment and to effectively interact with those devices in a natural, intuitive manner.

Figure 4A:
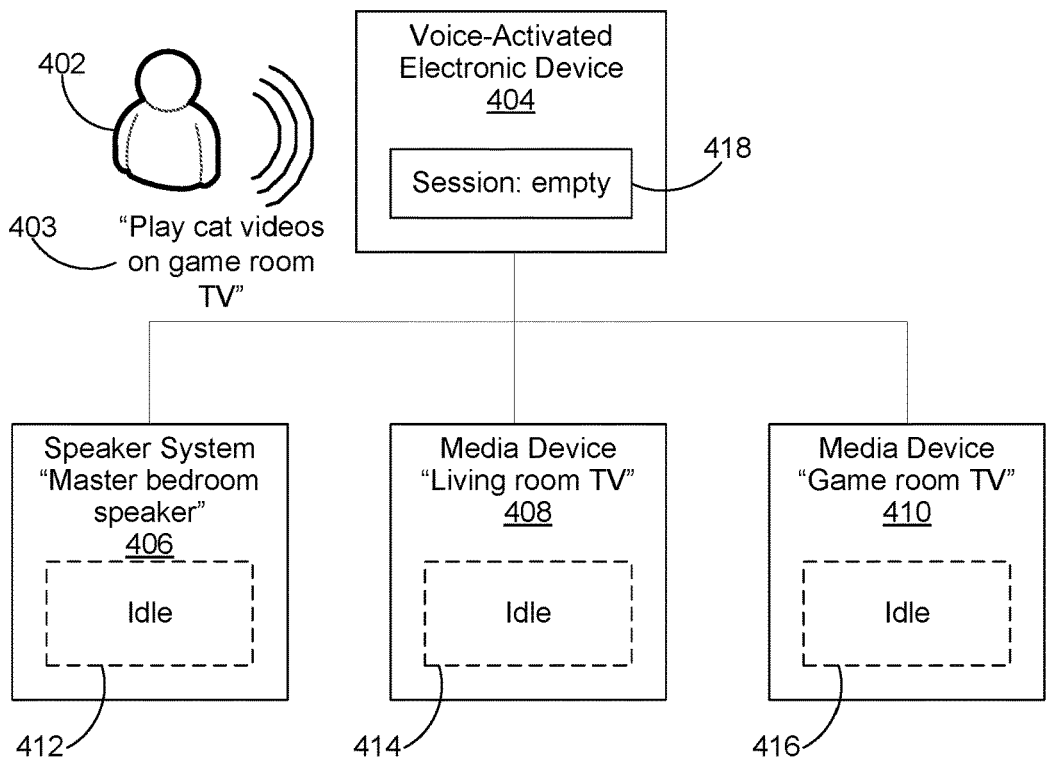
FIGS. 4A-4D illustrates an example of a focus session in accordance with some implementations.

In some implementations, voice processing states that can be visually indicated by a collection of LEDs (e.g., LEDs 404 as shown in FIG. 4A of the '566 application) using LED Design Language Elements described in the '566 application include the status of one or more focus sessions, identities of one or more users associated with one or more particular focus sessions, and/or duration of one or more active focus sessions. For example, similar to implementations and LED visual effects described with reference to FIGS. 4F, 4G and 4H of the '566 application, different light patterns, color combinations and/or specific motion of a collection of LEDs may be used to indicate that a focus session is active, has been extended due to detection of a second voice input, and/or has recently lapsed due to lack of user voice interaction with the electronic device 104. One or more identities of one or more users associated with particular focus sessions can also be indicated with different light patterns, color combinations and/or specific motion of a collection of LEDs that visually identify particular users.

In some implementations, when voice inputs to the voice-activated device 104 are used to control the media output devices via the cast devices, the voice-activated device 104 effectively enables a new level of control of cast-enabled media devices. In a specific example, the voice-activated device 104 includes a casual enjoyment speaker with far-field voice access and functions as a voice interface device for the voice assistant service. The voice-activated device 104 could be disposed in any area in the operating environment 100. When multiple voice-activated devices 104 are distributed in multiple rooms, they become cast audio receivers that are synchronized to provide voice inputs from these rooms.

Specifically, in some implementations, the voice-activated device 104 includes a Wi-Fi speaker with a microphone that is connected to a voice-activated voice assistant service (e.g., Google Assistant). A user can issue a media play request via the microphone of voice-activated device 104, and ask the voice assistant service to play media content on the voice-activated device 104 itself or on another connected media output device. For example, the user can issue a media play request by saying to the Wi-Fi speaker "OK Google, play cat videos on my Living room TV." The voice assistant service then fulfils the media play request by playing the requested media content on the requested device using a default or designated media application.

In some implementations, a user can issue a voice request, via the microphone of the voice-activated device 104, concerning media content that has already been played or is being played on a display device (e.g., the user can ask for information about the media content, buy the media content through an online store, or compose and issue a social post about the media content).

In some implementations, a user may want to take a current media session with them as they move through the house and can request such a service from one or more of the voice-activated devices 104. This requires the voice assistant service 140 to transfer the current media session from a first cast device to a second cast device that is not directly connected to the first cast device or has no knowledge of the existence of the first cast device. Subsequent to the media content transfer, a second output device coupled to the second cast device continues to play the media content previously a first output device coupled to the first cast device from the exact point within a music track or a video clip where play of the media content was forgone on the first output device. In some implementations, the voice-activated device 104 that receives the request to transfer the media session can satisfy the request. In some implementations, the voice-activated device 104 that receives the request to transfer the media session relays the request to another device or system (e.g., voice assistance server system 112) for handling.

Further, in some implementations, a user may issue, via the microphone of voice-activated device 104, a request for information or for performance of an action or operation. The information requested may be personal (e.g., the user's emails, the user's calendar events, the user's flight information, etc.), non-personal (e.g., sports scores, news stories, etc.) or somewhere in between (e.g., scores for teams or sports preferred by the user, news stories from the user's preferred sources, etc.). The requested information or action/operation may involve access to personal information (e.g., purchasing a digital media item with payment information provided by the user, purchasing a physical good). The voice-activated device 104 responds to the request with voice message responses to the user, where the response may include, for example, requests for additional information to fulfill the request, confirmation that the request has been fulfilled, notice that the request cannot be fulfilled, and so forth.

In some implementations, in addition to the voice-activated devices 104 and the media devices amongst the controllable devices 106, the operating environment 100 may also include one or more smart home devices amongst the controllable devices 106. The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the operating environment 100 as a cast device and/or an output device, and therefore, is located in proximity to or with a known distance with respect to the cast device and the output device.

The smart home devices in the operating environment 100 may include, but are not limited to, one or more intelligent, multi-sensing, network-connected thermostats, one or more intelligent, network-connected, multi-sensing hazard detectors, one or more intelligent, multi-sensing, network-connected entryway interface devices and (hereinafter referred to as "smart doorbells" and "smart door locks"), one or more intelligent, multi-sensing, network-connected alarm systems, one or more intelligent, multi-sensing, network-connected camera systems, one or more intelligent, multi-sensing, network-connected wall switches, one or more intelligent, multi-sensing, network-connected power sockets, and one or more intelligent, multi-sensing, network-connected lights. In some implementations, the smart home devices in the operating environment 100 of FIG. 1 includes a plurality of intelligent, multi-sensing, network-connected appliances (hereinafter referred to as "smart appliances"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, any one of these smart home device types can be outfitted with microphones and one or more voice processing capabilities as described herein so as to in whole or in part respond to voice requests from an occupant or user.

In some implementations, each of the controllable devices 104 and the voice-activated devices 104 is capable of data communications and information sharing with other controllable devices 106, voice-activated electronic devices 104, a central server or cloud-computing system, and/or other devices (e.g., a client device) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

Through the communication networks (e.g., the Internet) 110, the controllable devices 106 and the voice-activated devices 104 may communicate with a server system (also called a central server system and/or a cloud-computing system herein). Optionally, the server system may be associated with a manufacturer, support entity, or service provider associated with the controllable devices and the media content displayed to the user. Accordingly, the server system includes the voice assistance server 112 that processes audio inputs collected by voice-activated devices 104, one or more content hosts 114 that provide the displayed media content, optionally a cloud cast service server creating a virtual user domain based on distributed device terminals, and the device registry 118 that keeps a record of the distributed device terminals in the virtual user environment. Examples of the distributed device terminals include, but are not limited to the controllable devices 106, the voice-activated devices 104, and the media output devices. In some implementations, these distributed device terminals are linked to a user account (e.g., a Google user account) in the virtual user domain. It should be appreciated that processing of audio inputs collected by voice-activated devices 104, including the generation of responses to those inputs, can be performed locally at a voice-activated device 104, at a voice assistance server 112, at another smart home device (e.g., a hub device or a controllable device 106) or at some combination of all or subset of the above.

It will be appreciated that in some implementations the voice-activated device(s) 104 also function in an environment without smart home devices. For example, a voice-activated device 104 can, even in the absence of smart home devices, respond to user requests for information or performance of an action, and/or to initiate or control various media play functions. A voice-activated device 104 can also function in a wide range of environments, including, without limitation, a vehicle, a ship, a business, or a manufacturing environment.

In some implementations, a voice-activated device 104 is "awakened" (e.g., to activate an interface for the voice assistant service on the voice-activated device 104, to put the voice-activated device 104 into a state where the voice-activated device 104 is ready to receive voice requests to the voice assistant service) by a voice input that includes a hotword (also called a "wake word"). In some implementations, the voice-activated device 104 requires awakening if the voice-activated device 104 has been idle with respect to receipt of voice inputs for at least a predefined amount of time (e.g., 5 minutes); the predefined amount of time corresponds to an amount of idle time allowed before a voice interface session or conversation times out. The hotword may be a word or phrase, and may be a predefined default and/or may be customized by a user (e.g., a user may set a nickname for a particular voice-activated device 104 as the device's hotword). In some implementations, there may be multiple hotwords that can awaken a voice-activated device 104. A user may speak the hotword, wait for an acknowledgement response from the voice-activated device 104 (e.g., the voice-activated device 104 outputs a greeting), and them make a first voice request. Alternatively, the user may combine the hotword and the first voice request in one voice input (e.g., the voice input includes the hotword followed by the voice request).

In some implementations, a voice-activated device 104 interacts with a controllable device 106 (e.g., a media device, a smart home device), a client device or a server system of an operating environment 100 in accordance with some implementations. The voice-activated device 104 is configured to receive audio inputs from an environment in proximity to the voice-activated device 104. Optionally, the voice-activated device 104 stores the audio inputs and at least partially processes the audio inputs locally. Optionally, the voice-activated device 104 transmits the received audio inputs or the partially processed audio inputs to a voice assistance server system 112 via the communication networks 110 for further processing. The voice-activated device 104 or the voice assistance server system 112 determines if there is a request in the audio input and what the request is, determines and generates a response to the request, and transmits the request to one or more controllable device(s) 106. The controllable device(s) 106 receiving the response is configured to perform operations or change states in accordance with the response. For example, a media device is configured to obtain media content or Internet content from one or more content hosts 114 for display on an output device coupled to the media device, in accordance with a response to a request in the audio input.

In some implementations, the controllable device(s) 106 and the voice-activated device(s) 104 are linked to each other in a user domain, and more specifically, associated with each other via a user account in the user domain. Information on the controllable device 106 (whether on the local network 108 or on the network 110) and the voice-activated device 104 (whether on the local network 108 or on the network 110) are stored in the device registry 118 in association with the user account. In some implementations, there is a device registry for controllable devices 106 and a device registry for voice-activated devices 104. The controllable devices registry may reference devices in the voice-activated devices registry that are associated in the user domain, and vice versa.

In some implementations, one or more of the voice-activated devices 104 (and one or more cast devices) and one or more of the controllable devices 106 are commissioned to the voice assistant service 140 via a client device 103. In some implementations, the voice-activated device 104 does not include any display screen, and relies on the client device 103 to provide a user interface during a commissioning process, and similarly for a controllable device 106 as well. Specifically, the client device 103 is installed with an application that enables a user interface to facilitate commissioning of a new voice-activated device 104 and/or a controllable device 106 disposed in proximity to the client device. A user may send a request on the user interface of the client device 103 to initiate a commissioning process for the new electronic device 104/106 that needs to be commissioned. After receiving the commissioning request, the client device 103 establishes a short range communication link with the new electronic device 104/103 that needs to be commissioned. Optionally, the short range communication link is established based near field communication (NFC), Bluetooth, Bluetooth Low Energy (BLE) and the like. The client device 103 then conveys wireless configuration data associated with a wireless local area network (WLAN) (e.g., local network 108) to the new or electronic device 104/106. The wireless configuration data includes at least a WLAN security code (i.e., service set identifier (SSID) password), and optionally includes a SSID, an Internet protocol (IP) address, proxy configuration and gateway configuration. After receiving the wireless configuration data via the short range communication link, the new electronic device 104/106 decodes and recovers the wireless configuration data, and joins the WLAN based on the wireless configuration data.

In some implementations, additional user domain information is entered on the user interface displayed on the client device 103, and used to link the new electronic device 104/106 to an account in a user domain. Optionally, the additional user domain information is conveyed to the new electronic device 104/106 in conjunction with the wireless communication data via the short range communication link. Optionally, the additional user domain information is conveyed to the new electronic device 104/106 via the WLAN after the new device has joined the WLAN.

Once the electronic device 104/106 has been commissioned into the user domain, other devices and their associated activities may be controlled via multiple control paths. In accordance with one control path, an application installed on the client device 103 is used to control the other device and its associated activities (e.g., media play activities). Alternatively, in accordance with another control path, the electronic device 104/106 is used to enable eyes-free and hands-free control of the other device and its associated activities.

In some implementations, voice-activated devices 104 and controllable devices 106 may be assigned nicknames by a user (e.g., by the primary user with whom the devices are associated in the user domain). For example, a speaker device in the living room may be assigned a nickname "living room speaker." In this way, the user may more easily refer to a device in a voice input by speaking the device's nickname. In some implementations, the device nicknames and mappings to corresponding devices are stored at a voice-activated device 104 (which would store the nicknames of just the devices associated with the same user as the voice-activated device) and/or the voice assistance server system 112 (which would store device nicknames of devices associated with different users). For example, the voice assistance server system 112 stores many device nicknames and mappings across different devices and users, and voice-activated devices 104 associated with a particular user download nicknames and mappings for devices associated with the particular user for local storage.

In some implementations, a user may group one or more of the voice-activated devices 104 and/or controllable devices 106 into a group of devices created by the user. The group may be given a name, and the group of devices may be referred by the group name, similarly to referring to individual devices by nickname. Similarly to device nicknames, device groups and group names may be stored at a voice-activated device 104 and/or the voice assistance server system 112.

A voice input from the user may explicitly specify a target controllable device 106 or a target group of devices for the request in the voice input. For example, a user may utter a voice input "play classical music on the living room speaker." The target device in the voice input is "living room speaker"; the request in the voice input is a request to have the "living room speaker" play classical music. As another example, a user may utter a voice input "play classical music on the house speakers," where "house speakers" is a name of a group of devices. The target device group in the voice input is "house speakers"; the request in the voice input is a request to have the devices in the group "house speakers" play classical music.

A voice input from the user may not have an explicit specification of a target device or device group; a reference to a target device or device group by name is absent in the voice input. For example, following on the example voice input "play classical music on the living room speaker" above, the user may utter a subsequent voice input "pause." The voice input does not include a target device specification for the request for a pause operation. In some implementations, the target device specification in the voice input may be ambiguous. For example, the user may have uttered the device name incompletely. In some implementations, a target device or device group may be assigned to the voice input where an explicit target device specification is absent or the target device specification is ambiguous, as described below.

In some implementations, when a voice-activated device 104 receives a voice input with an explicit specification of a target device or device group, the voice-activated device 104 establishes a focus session with respect to the specified target device or device group. In some implementations, the voice-activated device 104 stores, for the focus session, a session start time (e.g., the timestamp of the voice input based on which the focus session was started) and, as the in-focus device for the focus session, the specified target device or device group. In some implementations, the voice-activated device 104 also logs subsequent voice inputs in the focus session. The voice-activated device 104 logs at least the most recent voice input in the focus session and optionally logs and retains preceding voice inputs within the focus session as well. In some implementations, the voice assistance server system 112 establishes the focus session. In some implementations, the focus session may be ended by a voice input explicitly specifying a different target device or device group.

While a focus session with respect to a device is active and the voice-activated device receives a voice input, the voice-activated device 104 makes one or more determinations with respect to the voice input. In some implementations, the determinations include: whether the voice inputs include an explicit target device specification, whether the request in the voice input is one that can be fulfilled by the in-focus device, and a time of the voice input compared to the time of the last voice input in the focus session and/or the session start time. If the voice input does not include an explicit target device specification, includes a request that can be fulfilled by the in-focus device, and satisfies predefined time criteria with respect to the time of the last voice input in the focus session and/or the session start time, then the in-focus device is assigned as the target device for the voice input. Further details regarding focus sessions are described below.

Devices in the Operating Environment

Figure 2:
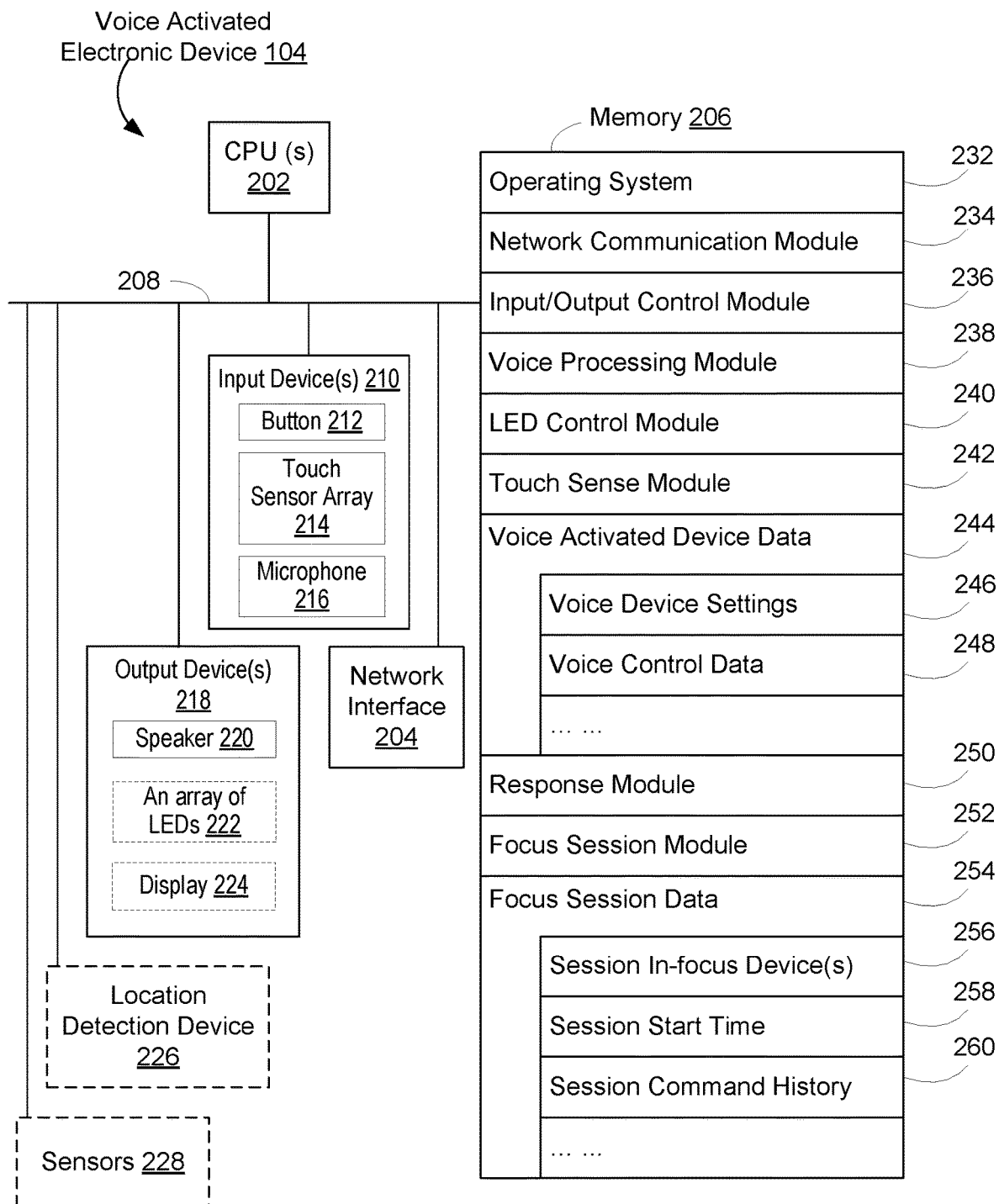
FIG. 2 illustrates an example voice-activated electronic device in accordance with some implementations.

FIG. 2 is a block diagram illustrating an example voice-activated device 104 that is applied as a voice interface to collect user voice commands in an operating environment (e.g., operating environment 100) in accordance with some implementations. The voice-activated device 104, typically, includes one or more processing units (CPUs) 202, one or more network interfaces 204, memory 206, and one or more communication buses 208 for interconnecting these components (sometimes called a chipset). The voice-activated device 104 includes one or more input devices 210 that facilitate user input, such as a button 212, a touch sense array 214, and one or more microphones 216. The voice-activated device 104 also includes one or more output devices 218, including one or more speakers 220, optionally an array of LEDs 222, and optionally a display 224. In some implementations, the array of LEDs 222 is an array of full color LEDs. In some implementations, a voice-activated device 104, depending on the type of device, has either the array of LEDs 222, or the display 224, or both. In some implementations, the voice-activated device 104 also includes a location detection device 226 (e.g., a GPS module) and one or more sensors 228 (e.g., accelerometer, gyroscope, light sensor, etc.).

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 232 including procedures for handling various basic system services and for performing hardware dependent tasks;

Network communication module 234 for connecting the voice-activated device 104 to other devices (e.g., the voice assistance service 140, one or more controllable devices 106, one or more client devices 103, and other voice-activated device(s) 104) via one or more network interfaces 204 (wired or wireless) and one or more networks 110, such as the Internet, other wide area networks, local area networks (e.g., local network 108), metropolitan area networks, and so on;

Input/output control module 236 for receiving inputs via one or more input devices and enabling presentation of information at the voice-activated device 104 via one or more output devices 218, including:

Voice processing module 238 for processing audio inputs or voice messages collected in an environment surrounding the voice-activated device 104, or preparing the collected audio inputs or voice messages for processing at a voice assistance server system 112;

LED control module 240 for generating visual patterns on the LEDs 222 according to device states of the voice-activated device 104; and Touch sense module 242 for sensing touch events on a top surface (e.g., on touch sensor array 214) of the voice-activated device 104;

Voice activated device data 244 for storing at least data associated with the voice-activated device 104, including:

Voice device settings 246 for storing information associated with the voice-activated device 104 itself, including common device settings (e.g., service tier, device model, storage capacity, processing capabilities, communication capabilities, etc.), information of one or more user accounts in a user domain, device nicknames and device groups, settings regarding restrictions when dealing with a non-registered user, and display specifications associated with one or more visual patterns displayed by the LEDs 222; and Voice control data 248 for storing audio signals, voice messages, response messages and other data related to voice interface functions of the voice-activated device 104;

Response module 250 for performing instructions included in voice request responses generated by the voice assistance server system 112, and in some implementations, generating responses to certain voice inputs; and Focus session module 252 for establishing, managing, and ending focus sessions with respect to devices.

In some implementations, the voice processing module 238 includes the following modules (not shown):

User identification module for identifying and disambiguating users who provide voice inputs to the voice-activated device 104;

Hotword recognition module for determining whether voice inputs include a hotword for waking up the voice-activated device 104 and recognizing such in the voice inputs; and Request recognition module for determining a user request included in a voice input.

In some implementations, memory 206 also stores focus session data 254 for an outstanding focus session, including the following:

Session in-focus device(s) 256 for storing an identifier of the device or device group in focus in an outstanding focus session (e.g., the device nickname, the device group name, MAC address(es) of the device(s));

Session start time 258 for storing a timestamp for the start of the outstanding focus session; and Session command history 260 for storing a log of prior requests or commands in the focus session, including at least the most recent request/command. The log includes at least the timestamp(s) of the logged prior request(s)/command(s).

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above. In some implementations, a subset of the programs, modules, and/or data stored in the memory 206 can be stored on and/or executed by the voice assistance server system 112.

In some implementations, one or more of the modules in memory 206 described above are part of a voice processing library of modules. The voice processing library may be implemented and embedded on a wide variety of devices. An example of a voice processing library is described in U.S. Provisional Patent Application No. 62/334,434, entitled "Implementations for Voice Assistant on Devices," filed May 10, 2016, which is incorporated by reference herein in its entirety. In some implementations, the voice assistant client library 240 shown in FIGS. 2 and 4 of the '434 application, which is incorporated herein, may include additional voice assistant library modules 240 described herein that are related to focus sessions. For example, without limitation, the voice assistant library 240 of the '434 application may include the response module 250 and/or focus session module 252 of FIG. 2 of this application, or modules providing other focus session functionality. Similarly, the platform APIs 244 shown in FIGS. 2 and 4 of the '434 application may include modules that allow the voice assistant library modules 240 of the '434 application (including those related to focus sessions), to interface with hardware functionality of a voice assistant device 104 and modules used for that purpose, including, without limitation, the LED control module 240 and/or the touch sense module 242 shown in FIG. 2 of this application.

As noted at para. [0071] of the '434 application, "[a]n advantage of the voice assistant client library organization depicted in FIG. 4 is that it enables the same or similar voice processing functionality to be provided on a wide range of voice assistant device types with [a] consistent APIs and sets of voice assistant functions. This consistency supports portability of voice assistant applications and consistency of voice assistant operations, which in turn promotes consistent user interactions and familiarity with voice assistant applications and functions that execute on different device types." Similarly, including modules that implement focus session functionality in the voice assistant library 240 of the '434 application would enable this useful functionality to be implemented in a wide range of voice assistant devices 104. In some implementations, all or part of the voice assistant client library 240 (including modules associated with focus sessions as described herein) may be provided at the server 112 of this application (similar to the server 114 of FIG. 3 of the '434 application) to support server-based voice assistant applications (e.g., server applications that operate on voice inputs transmitted to the server 114 for processing) that include focus session features.

Figure 3A:
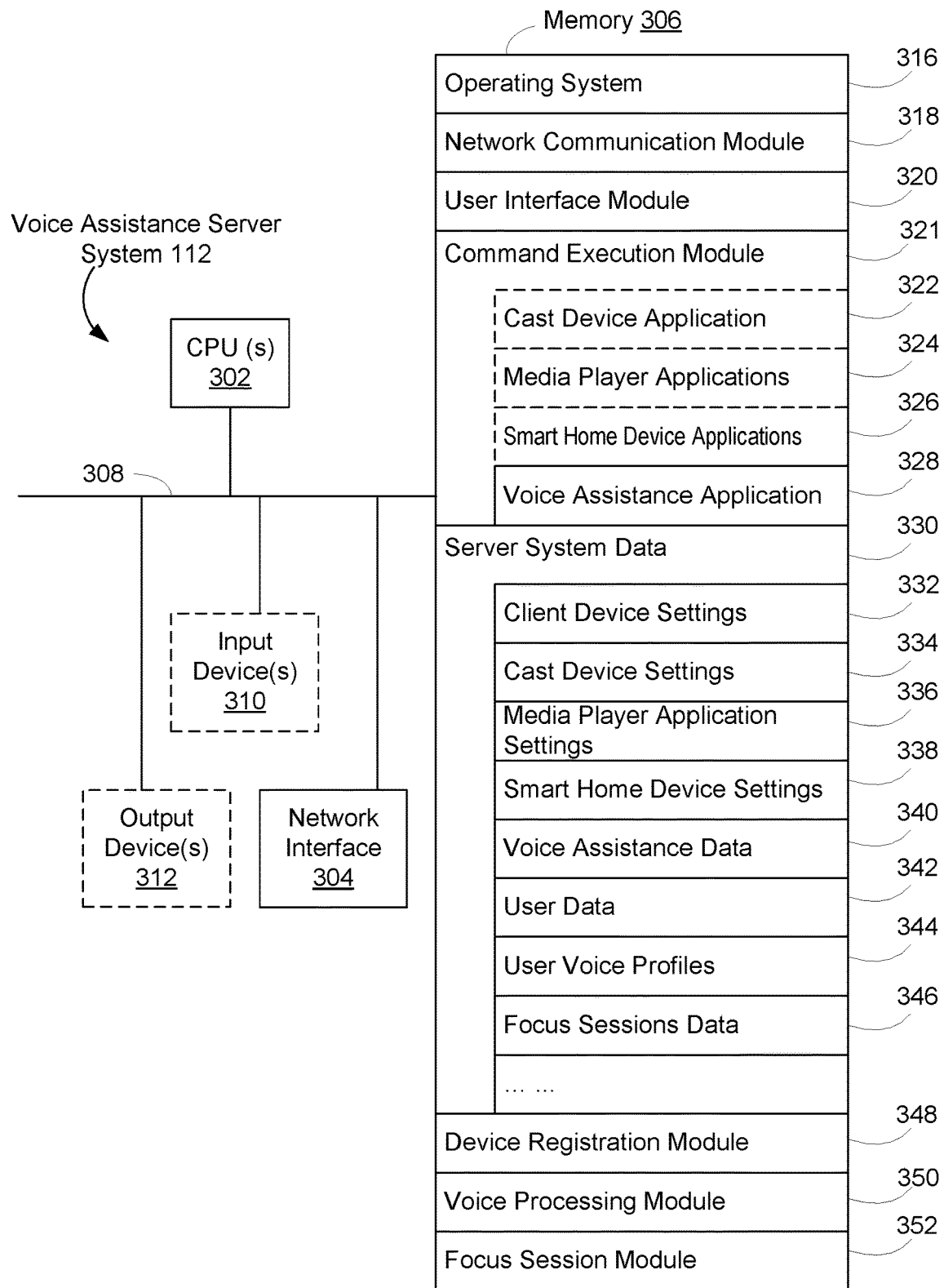
FIGS. 3A-3B illustrates an example voice assistance server system in accordance with some implementations.
Figure 3B:
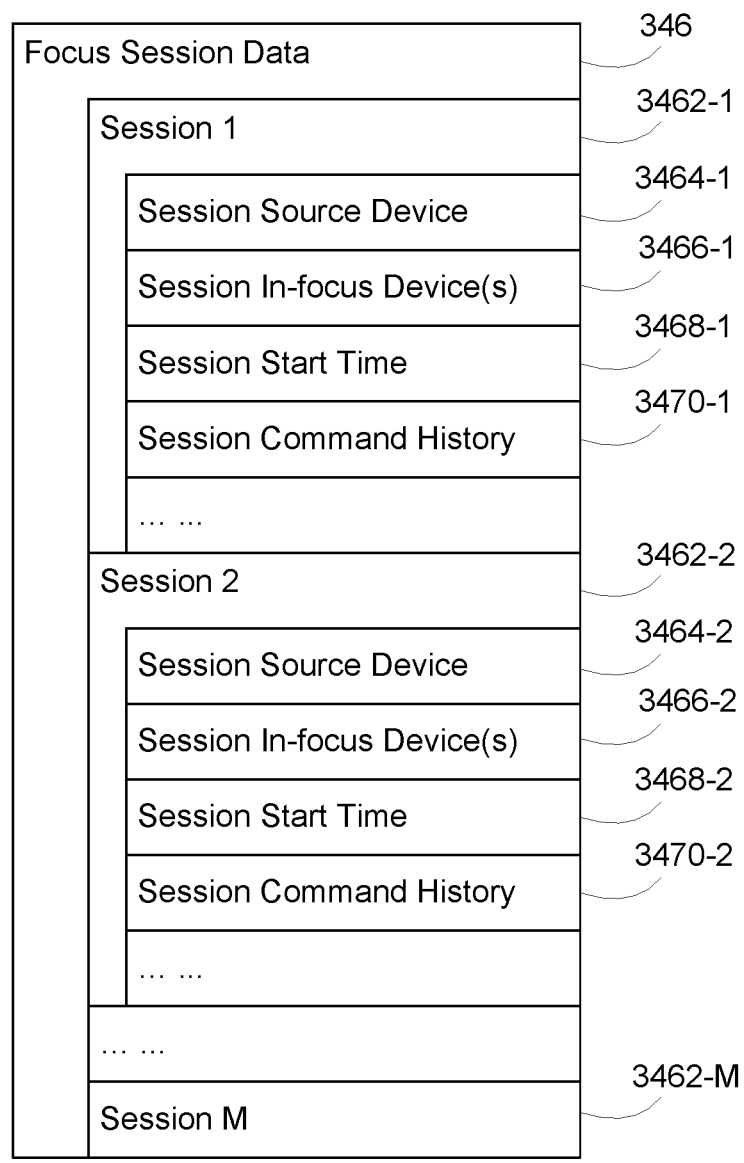

FIGS. 3A-3B are block diagrams illustrating an example voice assistance server system 112 of a voice assistant service 140 of an operating environment (e.g., operating environment 100) in accordance with some implementations. The server system 112, typically, includes one or more processing units (CPUs) 302, one or more network interfaces 304, memory 306, and one or more communication buses 308 for interconnecting these components (sometimes called a chipset). The server system 112 may include one or more input devices 310 that facilitate user input, such as a keyboard, a mouse, a voice-command input unit or microphone, a touch screen display, a touch-sensitive input pad, a gesture capturing camera, or other input buttons or controls. Furthermore, the server system 112 may use a microphone and voice recognition or a camera and gesture recognition to supplement or replace the keyboard. In some implementations, the server system 112 includes one or more cameras, scanners, or photo sensor units for capturing images, for example, of graphic series codes printed on the electronic devices. The server system 112 may also include one or more output devices 312 that enable presentation of user interfaces and display content, including one or more speakers and/or one or more visual displays.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the server system 112 to other devices (e.g., client devices 103, controllable devices 106, voice-activated devices 104) via one or more network interfaces 304 (wired or wireless) and one or more networks 110, such as the Internet, other wide area networks, local area networks, metropolitan area networks, and so on;
- User interface module 320 for enabling presentation of information (e.g., a graphical user interface for presenting application(s) 322-328, widgets, websites and web pages thereof, and/or games, audio and/or video content, text, etc.) at a client device;
- Command execution module 321 for execution on the server side (e.g., games, social network applications, smart home applications, and/or other web or non-web based applications for controlling a client device 103, a controllable device 106, a voice-activated device 104 and a smart home devices and reviewing data captured by such devices), including one or more of:
  - a cast device application 322 that is executed to provide server-side functionalities for device provisioning, device control, and user account management associated with cast device(s);
  - one or more media player applications 324 that is executed to provide server-side functionalities for media display and user account management associated with corresponding media sources;
  - one or more smart home device applications 326 that is executed to provide server-side functionalities for device provisioning, device control, data processing and data review of corresponding smart home devices; and
  - a voice assistance application 328 that is executed to arrange voice processing of a voice message received from the voice-activated device 104 or directly process the voice message to extract a user voice command and one or more parameters for the user voice command (e.g., a designation of a cast device or another voice-activated device 104); and
- Server system data 330 storing at least data associated with automatic control of media display (e.g., in an automatic media output mode and a follow-up mode) and other data, including one or more of:
  - Client device settings 332 for storing information associated with one or more client device, including common device settings (e.g., service tier, device model, storage capacity, processing capabilities, communication capabilities, etc.), and information for automatic media display control;
  - Cast device settings 334 for storing information associated with user accounts of the cast device application 322, including one or more of account access information, information for device settings (e.g., service tier, device model, storage capacity, processing capabilities, communication capabilities, etc.), and information for automatic media display control;
  - Media player application settings 336 for storing information associated with user accounts of one or more media player applications 324, including one or more of account access information, user preferences of media content types, review history data, and information for automatic media display control;
  - Smart home device settings 338 for storing information associated with user accounts of the smart home applications 326, including one or more of account access information, information for one or more smart home devices (e.g., service tier, device model, storage capacity, processing capabilities, communication capabilities, etc.);
  - Voice assistance data 340 for storing information associated with user accounts of the voice assistance application 328, including one or more of account access information, information for one or more voice-activated devices 104 (e.g., service tier, device model, storage capacity, processing capabilities, communication capabilities, etc.);
  - User data 342 for storing information associated with users in the user domain, including users' subscriptions (e.g., music streaming service subscriptions, video streaming service subscriptions, newsletter subscriptions), user devices (e.g., devices registered in the device registry 118 associated with respective users, device nicknames, device groups), user accounts (e.g., users' email accounts, calendar accounts, financial accounts), and other user data;
  - User voice profiles 344 for storing voice profiles of the users in the user domain, including, for example, voice models or voice fingerprints of the users and comfortable volume level thresholds of the users; and
  - Focus sessions data 346 for storing focus sessions data for multiple devices.
- Device registration module 348 for managing the device registry 118;
- Voice processing module 350 for processing audio inputs or voice messages collected in an environment surrounding the electronic device 104; and
- Focus session module 352 for establishing, managing, and ending focus sessions with respect to devices.

Referring to FIG. 3B, in some implementations, memory 306 also stores focus session data 346 for one or more outstanding focus sessions 3462-1 thru 3462-M, including the following:

- Session source device 3464 for storing an identifier of the device at which a focus session is established;
- Session in-focus device(s) 3466 for storing an identifier of the device or device group in focus in an outstanding focus session (e.g., the device nickname, the device group name, MAC address(es) of the device(s));
- Session start time 3468 for storing a timestamp for the start of the outstanding focus session; and
- Session command history 3470 for storing a log of prior requests or commands in the focus session, including at least the most recent request/command.

In some implementations, the voice assistance server system 112 is primarily responsible for processing of voice inputs, and thus one or more of the programs, modules, and data structures in memory 206 described above with reference to FIG. 2 are included in respective modules in memory 306 (e.g., the programs, modules, and data structures included with voice processing module 238 are included in voice processing module 350). The voice-activated device 104 either transmits captured voice inputs to the voice assistance server system 112 for processing, or first pre-processes the voice inputs and transmits the pre-processed voice inputs to the voice assistance server system 112 for processing. In some implementations, the voice assistance server system 112 and the voice-activated device 104 has some shared and some divided responsibilities regarding processing of voice inputs, and the programs, modules, and data structures shown in FIG. 2 may be included in both or divided amongst the voice assistance server system 112 and the voice-activated device 104. Other programs, modules, and data structures shown in FIG. 2, or analogues thereof, may also be included in the voice assistance server system 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Example Focus Session

FIGS. 4A-4D illustrate an example of a focus session in accordance with some implementations. In an operating environment with a voice-activated device 104 (e.g., operating environment 100) and multiple controllable devices 106, when a user in the environment makes a voice input specifying one of the controllable devices 106 as a target device, a focus session may be established with the target device as the in-focus device.

FIG. 4A shows a voice-activated device 404 (e.g., voice-activated device 104) and three controllable devices 406, 408, and 410 (e.g., controllable devices 106) in an operating environment (e.g., operating environment 100). The devices may be in the same space as a user 402 (e.g., in the same room) or spread throughout a structure in which the user is located. Device 406 is a speaker system nicknamed "master bedroom speaker." Device 408 is a media device nicknamed "living room TV." Device 410 is a media device nicknamed "game room TV." There is no focus session at the moment; focus session 418 is empty.

Figure 4B:
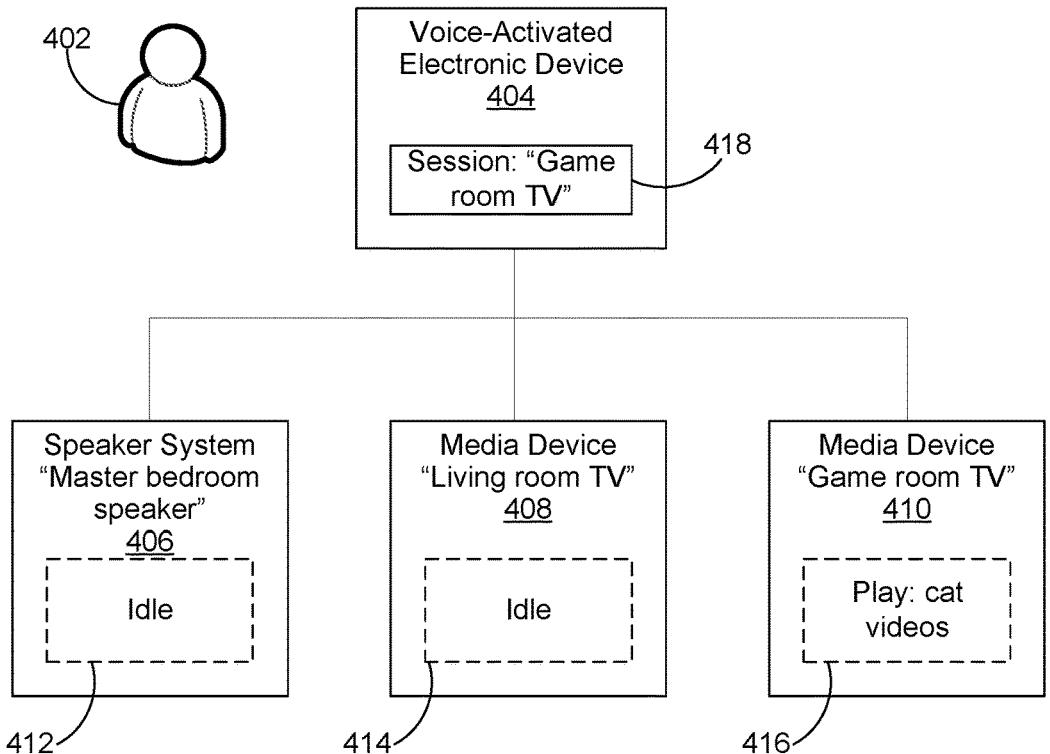

The user 402 utters a voice input 403 "play cat videos on game room TV," and the voice-activated device 404 receives the voice input. The voice-activated device 404 determines that the request in the voice input 403 is a request to play cat videos, and the target device is the "game room TV" device 410 explicitly specified in the voice input 403. A session 418 with the in-focus device being the "game room TV" device 410 is established at the voice-activated device 404, as shown in FIG. 4B. A command to play cat videos is sent (by the device 404 or the voice assistance server system 112) to the "game room TV" device 410, and the device 410 performs the operation 416.

Figure 4C:
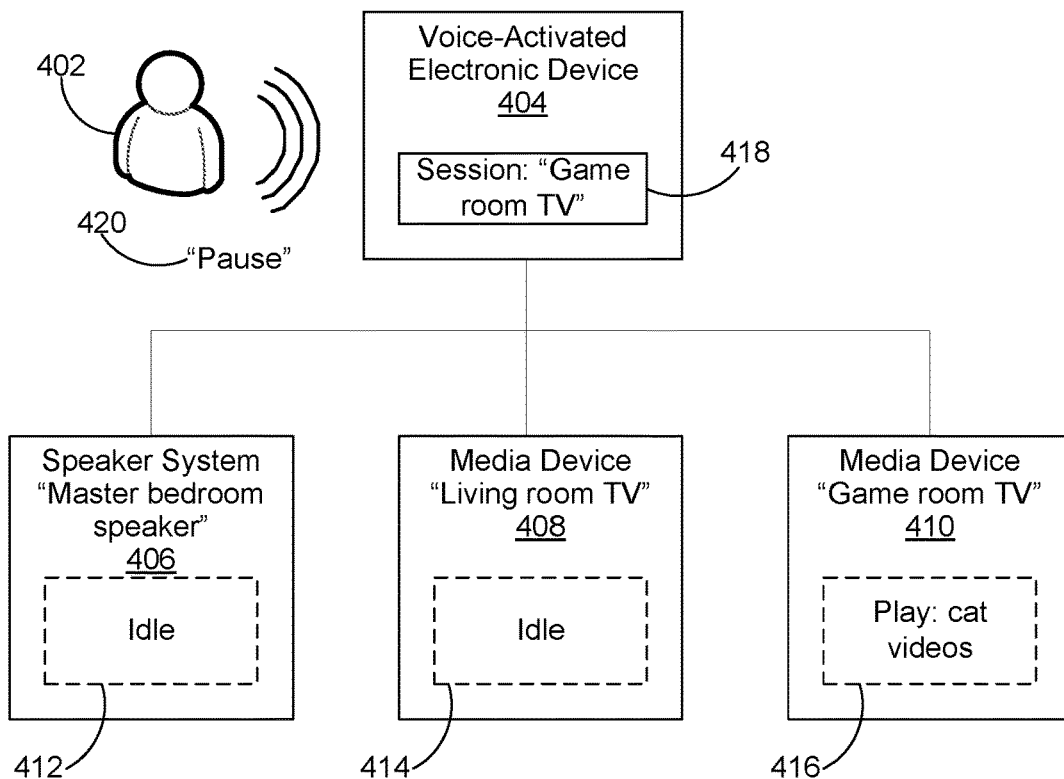

Referring to FIG. 4C, subsequently, while the session 418 with the "game room TV" 410 in focus is active and the operation 416 is being performed by the device 410, the user 402 utters another voice input "pause" 420. The voice-activated device 404 determines whether the voice input 420 includes a specification of a target device, and whether the request in the voice input 420 can be performed by the in-focus device 410. In the case of the specific voice input 420 "pause," the voice-activated device 404 determines that the voice input 420 does not include a specification of a target device and that the request in the voice input ("pause" whatever is playing) can be performed by the in-focus device. In some implementations, determining whether the voice input 420 includes a specification of a target device includes looking for matches to device nicknames in the voice input (e.g., performing speech-to-text recognition on the voice input and parsing the text to look for device nicknames). In some implementations, determining whether a request in the voice input can be performed by the in-focus device includes determining what the request in the voice input is and comparing the request to the command history (e.g., history 260) of the current focus session 418 for consistency with the last command in the session (e.g., a "pause music" request is inconsistent with a most recent command that is "pause music"), as well as comparing the request for consistency with capabilities of the in-focus device (e.g., a "pause music" request is inconsistent with the capabilities of a smart light).

Figure 4D:
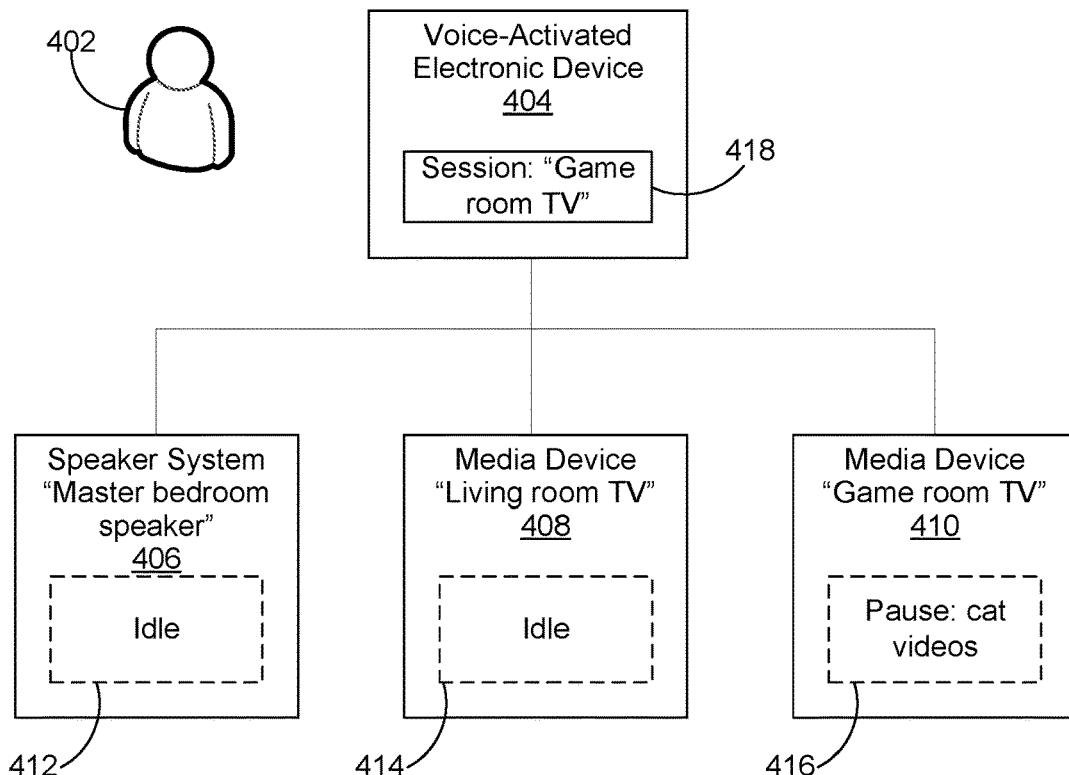

In some implementations, the voice-activated device 404 also determines whether the voice input 420 meets one or more focus session maintenance criteria. In some implementations, a focus session maintenance criterion is that the timestamp of the voice input 420 is within a certain time from the timestamp of the last voice input 403 in the active session (e.g., the second voice input is received within a certain time of the preceding first voice input). In some implementations, there are multiple time thresholds for this criterion. For example, there may be a first, shorter time threshold (e.g., 20 minutes) and a second, longer time threshold (e.g., 4 hours). If the voice input 420 is received within the first, shorter threshold of the last voice input 403, and the other criteria above are satisfied, then the in-focus device is set as the target device for the voice input 420 (and, in some implementation, transmits this target device setting as well when transmitting the voice input 420 to the voice assistance server system 112 for processing). For example, voice input 420 is determined to not include a target device specification and that the request "pause" is consistent with the last command "play cat videos." If the voice input 420 is received within the shorter time threshold of voice input 403, then the in-focus device, "game room TV" device 410, is set as the target device for voice input 420, and the operation 416 being performed at the "game room TV" device 410 is pausing the cat videos in accordance with the voice input 420, as shown in FIG. 4D.

If the voice input 420 is received after the first, shorter threshold, and within the second, longer threshold, of the last voice input 403, and the other criteria above are satisfied, the voice-activated device 404 outputs a voice prompt to request confirmation from the user that the in-focus device is the desired target device for the voice input 420. The voice-activated device 404, upon receiving confirmation that the in-focus device is the desired target device, maintains the session 418 and sets the in-focus device as the target device for the voice input 420 (and, in some implementation, transmits this target device setting as well when transmitting the voice input 420 to the voice assistance server system 112 for processing). If the user does not confirm the target device, the voice-activated device 404 may request that the user provide a target device specification, request that the user say the voice input again but include a target device specification, and/or end the session 418. In some implementations, if the voice input 420 is received after the second, longer threshold from of the last voice input 403, or the other criteria described above are not satisfied, the session 418 is ended. In some implementations, the values of these time thresholds are stored in memory 206 and/or memory 306. Time elapsed between voice inputs is compared to these thresholds.

In some implementations, the lack of an explicitly specified target device in the voice input and consistency of the request in the voice input with the last voice input and with the capabilities of the in-focus device are also considered to be focus session maintenance criteria.

Example Process

FIG. 5 is a flow diagram illustrating a method 500 of responding to a voice input of a user in accordance with some implementations. In some implementations, the method 500 is implemented at a first electronic device (e.g., voice-activated device 104) with one or more microphones, a speaker, one or more processors and memory storing one or more programs for execution by the one or more processors. This first electronic device is a member of a local group of connected electronic devices (e.g., voice-activated devices 104 and controllable devices 106 associated with a user account; controllable devices 106 associated with a particular voice-activated device 104) communicatively coupled (e.g., through networks 110) to a common network service (e.g., the voice assistance service 140).

The first electronic device receives (502) a first voice command including a request for a first operation. For example, a voice-activated device 404 receives a first voice input 403.

The first electronic devices determine (504) a first target device for the first operation from among the local group of connected electronic devices. The voice-activated device 404 determines (e.g., based on processing by the voice processing module 238) a target device (or device group) for the voice input 403 from among the devices 406, 408, and 410. The voice-activated device 404 recognizes the target device specification "game room TV" in the voice input 403 as "game room TV" device 410.

The first electronic device establishes (506) a focus session with respect to the first target device (or device group). The voice-activated device 404 (e.g., the focus session module 252) establishes a focus session 418 with the "game room TV" device 410 as the in-focus device.

The first electronic device causes (508) the first operation to be performed by the first target device (or device group) via operation of the common network service. The voice-activated device 404 or the voice assistance server system 112 transmits a command, via the voice assistance service 140, to device 410 to perform the operation requested in voice input 403.

The first electronic device receives (510) a second voice command including a request for a second operation. The voice-activated device 404 receives a second voice input 420.

The first electronic device determines (512) that the second voice command does not include an explicit designation of a second target device (or device group). The voice-activated device 404 determines (e.g., based on processing by the voice processing module 238) a target device for the voice input 420, and recognizes that the voice input 420 does not include a target device specification.

The first electronic device determines (514) that the second operation can be performed by the first target device (or device group). The voice-activated device 404 determines that the operation requested in the voice input 420 is capable of being performed by the in-focus device 410 and is consistent with the last operation requested in voice input 403 and being performed by the in-focus device 410.

The first electronic device determines (516) whether the second voice command satisfies one or more focus session maintenance criteria. The voice-activated device 404 determines whether the voice input 420 is received within a certain time of the voice input 403.

In accordance with a determination that the second voice command satisfies the focus session maintenance criteria, the first electronic device causes (518) the second operation to be performed by the first target device (or device group) via operation of the common network service. The voice-activated device 404 determines that the voice input 420 is received within a first, shorter time threshold of voice input 403, and in accordance with that determination sets the target device for the voice input 420 to be the in-focus device 410. The voice-activated device 404 or the voice assistance server system 112 transmits a command, via the voice assistance service 140, to device 410 to perform the operation requested in voice input 420.

In some implementations, determining a first target device for the first operation from among the local group of connected electronic devices includes obtaining an explicit designation of the first target device from the first voice command. The voice-activated device 404 may pre-process the voice input 403 to determine if the voice input 403 includes an explicit specification of a target device. The voice-activated device 404 may, alternatively, receive the explicit specification of a target device from the voice assistance server system 112 that processed the voice input 403.

In some implementations, determining a first target device for the first operation from among the local group of connected electronic devices includes determining that the first voice command does not include an explicit designation of the first target device, determining that the first operation can be performed by a second electronic device among the local group of connected electronic devices, and selecting the second electronic device as the first target device. If the first voice input does not include an explicit specification of a target, but the request included within the first voice input is one that can be performed by a single device within the group (e.g., a video-related command and there is just one video-capable device in the group), then the single device is set as the target device for the first voice input. Further, in some implementations, if there is, besides the voice-activated device, just one controllable device, the controllable device is the default target device for voice inputs that do not explicitly specify a target device and whose requested operations can be performed by the controllable device.

In some implementations, a user's voice input history (e.g., collected by voice assistance server system 112 and stored in memory 306, collected by voice-activated device 104 and stored in memory 206) may be analyzed (e.g., by the voice assistance server system 112 or the voice-activated device 104) to determine if the history shows that a particular voice-activated device 104 is frequently used to control a specific controllable device 106. If the history does show such a relationship, the specific controllable device may be set as a default target device for voice inputs to the voice-activated device.

In some implementations, a specification (e.g., an identifier) of a default target device is stored at the voice-activated device 104 and/or the voice assistance server system 112.

In some implementations, in accordance with the determination that the second voice command satisfies the focus session maintenance criteria, extending the focus session with respect to the first target device. In some implementations, a focus session times out (i.e., ends) after a certain amount of time. The focus session 418 may be extended time-wise (e.g., reset the timeout timer) if the second voice input 420 satisfies the focus session maintenance criteria.

In some implementations, establishing the focus session with respect to the first target device includes storing a timestamp of the first voice command, and storing an identifier of the first target device. When a focus session is established after receiving the voice input 403, the voice-activated device 404 stores the time of the voice input 403 (e.g., in session command history 260) and an identifier of the in-focus device 410 (e.g., in session in-focus device 256).

In some implementations, the focus session maintenance criteria includes a criterion that the second voice command is received by the first electronic device within a first predefined time interval with respect to receiving the first voice command or with a second predefined time interval with respect to receiving the first voice command, the second predefined time interval succeeding the first predefined time interval; and determining whether the second voice command satisfies the one or more focus session maintenance criteria includes determining whether the second voice command is received within any of the first predefined time interval or the predefined second time interval. The voice-activated device 404 determines whether the voice input 420 satisfies one or more focus session maintenance criteria, including whether the voice input 420 is received within a first time threshold or a second time threshold of the voice input 403.

In some implementations, in accordance with a determination that the second voice command is received within the first predefined time interval, the first electronic device selects the first target device as a target device for the second voice command. If the voice input 420 is determined to be received within the first, shorter time threshold from the voice input 403, then the in-focus device 410 is set to be the target device for voice input 420.

In some implementations, in accordance with a determination that the second voice command is received within the second predefined time interval, the first electronic device outputs a request to confirm the first target device as a target device for the second voice command; and in accordance with a positive confirmation of the first target device in response to request to confirm, selects the first target device as a target device for the second voice command. If the voice input 420 is determined to be received outside the first, shorter time threshold, but within the second, longer time threshold, from the voice input 403, the voice-activated device prompts the user for confirmation of a target device (e.g., asks the user if the in-focus device 410 is the intended target device). If the user confirms that the in-focus device 410 is the intended target device, the in-focus device 410 is set as the target device for voice input 420.

In some implementations, the first electronic device receives a third voice command including a request for a third operation and an explicit designation of a third target device among the local group of connected electronic devices, ends the focus session with respect to the first target device, establishes a focus session with respect to the third target device, and causes the third operation to be performed by the third target device via operation of the common network service. The voice-activated device 404 may receive a new voice input, after voice input 420, that includes an explicit specification of a target device other than device 410 (e.g., device 406 or 408). In accordance with receipt of that voice input, the focus session 418 with device 410 in focus ends, and a new session with the new target device in focus is established. The voice-activated device 404 or the voice assistance server system 112 transmits a command, via the voice assistance service 140, to the new target device to perform the operation requested in the new voice input.

In some implementations, the first target device is the first electronic device. The first electronic device receives a fourth voice command including a request for a fourth operation and an explicit designation of a fourth target device among the local group of connected electronic devices, where the fourth target device is a third electronic device member of the local group of connected electronic devices, the third electronic device different from the first electronic device; maintains the focus session with respect to the first target device; and causes the fourth operation to be performed by the fourth target device via operation of the common network service. If the in-focus device for an active focus session 418 at the voice-activated device 404 is the voice-activated device 404 itself, and then a new voice input specifying a different device as the target is received after voice input 420, then the voice-activated device 404 or the voice assistance server system 112 transmits a command, via the voice assistance service 140, to the different target device to perform the operation requested in the new voice input, but the focus session is maintained with the voice-activated device 404 in focus.

In some implementations, the second voice command is received after the fourth operation is caused to be performed by the fourth target device, the first operation is a media playback operation, and the second operation is a media stoppage operation. The first electronic device receives a fifth voice command including a request for a fifth operation and an explicit designation of a fifth target device among the local group of connected electronic devices, where the fifth target device is the third electronic device; ends the focus session with respect to the first target device; establishes a focus session with respect to the fifth target device, and causes the fifth operation to be performed by the fifth target device via operation of the common network service. If the in-focus device for an active focus session 418 at the voice-activated device 404 is the voice-activated device 404 itself, and the voice input 403 included a request to initiate media playback, and the voice input 403 included a request to pause the media playing as a result of voice input 403, and a new voice input specifying a different device as the target is received after voice input 420, then the voice-activated device 404 or the voice assistance server system 112 transmits a command, via the voice assistance service 140, to the different target device to perform the operation requested in the new voice input, and the focus session with the voice-activated device in focus is ended, and a new focus session with the new target device in focus is established.

In some implementations, the first electronic device receives a fifth voice command including a predefined operation termination request, and in accordance with receiving the fifth voice command, causes the first operation to cease to be performed by the first target device, and ends the focus session with respect to the first target device. If the voice-activated device 404 receives a predefined termination command (e.g., "STOP"), the voice-activated device 404 or the voice assistance server system 112 transmits a command, via the voice assistance service 140, to device 410 to cease performing the operation 416, and the focus session 418 is ended.

In some implementations, the first operation is a media playback operation, and the second operation is one of: a media stoppage operation, a media rewind operation, a media fast forward operation, a volume up operation, and a volume down operation. The request in voice input 403 may be a request to initiate playback of media content (e.g., video, music), and the request in voice input 420 may be a request to control the playback (e.g., pause, rewind, fast forward, change volume up/down, next item/track, previous item/track, etc.)

In some implementations, the first operation is a device state change operation to a first state of a plurality of device states, and the second operation is a device state change operation to a second state of the plurality of device states. The request in voice input 403 may be a request to transition to a first state (e.g., turn light or device on, go to sleep mode), and the request in voice input 420 may be a request to transition to a second state (e.g., turn light or device off, wake from to sleep mode).

In some implementations, the first operation is a magnitude change operation in a first direction in a magnitude scale, and the second operation is a magnitude change operation in a second direction, opposite of the first direction, in the magnitude scale. The request in voice input 403 may be a request to change magnitude in one direction (e.g., brighten light, change volume up), and the request in voice input 420 may be a request to change magnitude in the opposite direction (e.g., dim light, change volume down).

In some implementations, the first electronic device includes an array of one or more LEDs. The first electronic device indicates a status of the focus session by illuminating one or more of the LEDs in the array of LEDs. The voice-activated device 404 may indicate that there is an active focus session, or other states and other information (e.g., indication of how long the focus session has been active or how much time has elapsed since the last voice input) associated with the focus session, by displaying patterns on the LED array.

In some implementations, focus sessions may be established per identified user. For example, if a user speaks a voice input specifying a target device, the user is identified and a focus session is established with respect to the identified user, with the target device specified in the voice input being in focus. If a different user speaks a voice input and specifies a different target device, the different user is identified and another focus session is established with respect to the identified different user, with the different target device being in focus. Voice inputs spoken by different users and not specifying a target device may be assigned different target devices based on the active focus session corresponding to the respective identified user. Examples of speaker identification are described in U.S. patent application Ser. No. 15/284,476, titled "Multi-User Personalization at a Voice Interface Device," filed Oct. 3, 2016, which is incorporated by reference herein in its entirety.

Additional Examples of Focus Sessions

The following implementations describe implementations in a context of a voice-activated device 104 in a same room as one or more controllable devices 106 that are media devices. It should be appreciated that the implementations described below may be adapted to other types of controllable devices 106 (e.g., smart home devices) and to other device placement setups.

In some implementations, a focus session can be started with the in-focus device being a controllable device other than the voice-activated device if there is no media already playing on the voice-activated device. In some implementations, if media playing on the voice-activated device is paused, a focus session may be started with a controllable device other than the voice-activated device as the in-focus device.

In some implementations, a focus session is started if the user issues any valid request that has an explicit target device that is directed to a device or device group associated with the voice-activated device (and optionally on the same WiFi network as the voice-activated device). Examples of such valid requests include "play some music on my living room speakers," "turn up the volume on the bedroom tv," "next song on my Home Group," and "pause the living room speakers." The explicit target device becomes the in-focus device for the focus session.

In some implementations, if the request is clearly a request associated with video, and there is a single video-capable device amongst the associated controllable devices, then a focus session may be established with the video-capable device as the in-focus device.

In some implementations, if a request with another device as the target device is received while the voice-activated device is actively playing media, focus will remain on the voice-activated device, but once the voice-activated device stopped or paused its session, any new request to play or control media on another device moves the focus to that another device.

For example, the user requests "play Lady Gaga," and the voice-activated device starts playing Lady Gaga music and starts a focus session with the voice-activated device in focus. The user then requests "pause," and the voice-activated device pauses the Lady Gaga music (and maintains the focus session for, say, 2 hours). After 1 hour has passed, the user then requests "play cat videos on my TV." The focus moves to the TV, and the TV starts playing cat videos.

As another example, the user requests "play Lady Gaga," and the voice-activated device starts playing Lady Gaga music and starts a focus session with the voice-activated device in focus. The user then requests "show cat videos on my TV," and the cat videos start showing on the TV, but focus remains on the voice-activated device. The user then requests "next," the voice-activated device advances to the next track in the Lady Gaga music in accordance with the request. The user then requests "pause," and music at the voice-activated device is paused. The user then requests "next slide on my TV," and the next slide starts on the TV and focus is transferred to the TV.

In some implementations, a valid requests includes initiating music, initiating video, initiating news reading (e.g., reading out news articles), initiating podcasts, initiating photos (e.g., photo display or slideshow), and any media control command (other than a predefined STOP command that ends any current focus session.)

In some implementations, a focus session is ended when any of the following occurs:
  focus session is transferred to a different device (via voice
    input, e.g., the voice input explicitly specifying the
    different device), and in this case a focus session is
    started with the different device;
  focus session starts or resumed (out of pause state) on the
    voice-activated device via voice input or casting from
    another device (e.g., via voice: "Play Lady Gaga on
    <nickname of voice-interface device>", "Play Lady
    Gaga locally", etc.; via casting: the user casts content to
    the voice-activated device via an application on a client
    device);
  however, if the voice-activated device is a member
    (follower or leader) of the group that is about to play
    media, it will not will not stop the focus (even though it is playing). So focus will remain on the leader of the group (which might be another voice-activated device);

when the request is a predefined "STOP" command (including all relevant grammar) to the controllable device that is in-focus;

timeout related commands:
   timeouts may be measured from the last request or command given to the controllable device, whether the controllable device is explicitly specified or set based on the in-focus device of the focus session, other than the predefined "STOP" command;
   timeout may be 240 minutes across the various possible commands; and when the user presses a button on the voice-activated device used for pause/play (in addition this will also resume any paused content locally on the voice-activated device).

In some implementations, the voice-activated device request user confirmation of the target device. The user is prompted for confirmation if he wants to play media on a controllable device as follows:

The prompt is triggered for media initiation (e.g., start music where none had been playing) (vs media control, such as fast forward or next track);

The prompt is triggered when a focus session is active; and

The prompt is triggered after some time (e.g., 20 minutes) has passed from the last voice command from the current voice-activated device given to the controllable device, whether the controllable device is explicitly specified or set based on the in-focus device of the focus session, other than the predefined "STOP" command.

The prompt to confirm may be, for example:

The voice-activated device outputs "Would you like me to play on <controllable device name>?"
   User responds "Yes." Then the requested media is played on the in-focus controllable device and focus is maintained on that device.
   User responds "No." Then the requested media is played on the voice-activated device and the focus session is ended.
   Other: if, for example, the user's response is unclear, the voice-activated device may output "Sorry, couldn't understand your response."

In some implementations, when a focus session is initiated, media initiation and voice based control commands are applied to the in-focus controllable device. Non-media requests (e.g., searches, questions) are answered by the voice-activated device, and the non-media requests do not end the focus session.

In some implementations, even when a focus session has started, physical interactions will still control the voice-activated device, so physical interaction (e.g., pressing a button, touching a touch-sensitive area) with the voice-activated device to change volume and pause/play affects the voice-activated device and not necessarily the controllable device.

In some implementations, requests or commands issued to timers/alarms/text-to-speech playing on the voice-activated device has higher priority than similar requests or commands to the in-focus controllable device. For example, if the voice-activated device is ringing for a timer or an alarm, and the user utters "stop," the voice-activated device stops the timer or alarm ringing. If the user then utters "volume <up/down>," the timer or alarm ringing is still stopped, and the volume on the controllable device is changed up or down.

As another example, if the voice-activated device is playing text-to-speech (e.g., reading out the user's emails), and the user utters "stop," the voice-activated device stops the text-to-speech reading. If the user then utters "volume <up/down>," the volume on the voice-activated device is changed up or down.

As yet another example, if the voice-activated device is idle, paused, or app-loaded, and the user utters "stop," media playing at the controllable device is stopped and the focus session is ended. If the user then utters "volume <up/down>," the volume on the controllable device is changed up or down.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described implementations. The first device and the second device are both types of devices, but they are not the same device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method, comprising:
   at a first electronic device with one or more microphones, a speaker, one or more processors, and memory storing one or more programs for execution by the one or more processors, the first electronic device being a member of a local group of connected electronic devices communicatively coupled to a server-implemented common network service:
      receiving a first voice command including a request for a first operation;
      determining a first target device for the first operation from among the local group of connected electronic devices based on content of the first voice command;
      establishing a focus session with respect to the first target device, wherein establishing a focus session with respect to the first target device includes assigning the first target device as an in-focus device for performing the first operation;
      in accordance with the assigning of the first target device as the in-focus device for performing the first operation, causing the first operation to be performed by the first target device via operation of the server-implemented common network service;
      during pendency of the focus session with respect to the first target device:
         receiving a second voice command including a request for a second operation;
         determining that the second voice command does not include an explicit designation of a second target device;
         determining that the second operation can be performed by the first target device;
         determining whether the second voice command satisfies one or more focus session maintenance criteria; and
         in accordance with (i) a determination that the second voice command satisfies the focus session maintenance criteria, (ii) the determination that the second voice command does not include an explicit designation of a second target device, and (iii) the determination that the second operation can be performed by the first target device, maintaining the focus session with respect to the first target device, including:
            assigning the first target device as the in-focus device for performing the second operation; and
            in accordance with the assigning of the first target device as the in-focus device for performing the second operation, causing the second operation to be performed by the first target device via operation of the server-implemented common network service.

2. The method of claim 1, wherein determining a first target device for the first operation from among the local group of connected electronic devices comprises:
   obtaining an explicit designation of the first target device from the first voice command.

3. The method of claim 1, wherein determining a first target device for the first operation from among the local group of connected electronic devices comprises:
   determining that the first voice command does not include an explicit designation of the first target device;
   determining that the first operation can be performed by a second electronic device among the local group of connected electronic devices; and
   selecting the second electronic device as the first target device.

4. The method of claim 1, further comprising:
   in accordance with a determination that the second voice command satisfies focus session maintenance criteria, extending the focus session with respect to the first target device.

5. The method of claim 1, wherein establishing the focus session with respect to the first target device comprises:
   storing a timestamp of the first voice command; and
   storing an identifier of the first target device.

6. The method of claim 1, further comprising:
   receiving a third voice command including a request for a third operation and an explicit designation of a third target device among the local group of connected electronic devices;
   ending the focus session with respect to the first target device;
   establishing a focus session with respect to the third target device; and
   causing the third operation to be performed by the third target device via operation of the server-implemented common network service.

7. The method of claim 1, wherein the first target device is the first electronic device; further comprising:
   receiving a fourth voice command including a request for a fourth operation and an explicit designation of a fourth target device among the local group of connected electronic devices, wherein the fourth target device is a third electronic device among the local group of connected electronic devices, the third electronic device different from the first electronic device;
   maintaining the focus session with respect to the first target device;

causing the fourth operation to be performed by the fourth target device via operation of the server-implemented common network service.

8. The method of claim 7, wherein:
the second voice command is received after the fourth operation is caused to be performed by the fourth target device;
the first operation is a media playback operation; and
the second operation is a media stoppage operation; and
the method further comprising:
  receiving a fifth voice command including a request for a fifth operation and an explicit designation of a fifth target device among the local group of connected electronic devices, wherein the fifth target device is the third electronic device;
  ending the focus session with respect to the first target device;
  establishing a focus session with respect to the fifth target device; and
  causing the fifth operation to be performed by the fifth target device via operation of the server-implemented common network service.

9. An electronic device, comprising:
one or more microphones;
a speaker;
one or more processors; and
memory storing one or more programs to be executed by the one or more processors, wherein the electronic device is a member of a local group of connected electronic devices communicatively coupled to a server-implemented common network service, and the one or more programs comprising instructions for performing:
  receiving a first voice command including a request for a first operation;
  determining a first target device for the first operation from among a local group of connected electronic devices based on content of the first voice command;
  establishing a focus session with respect to the first target device, wherein establishing a focus session with respect to the first target device includes assigning the first target device as an in-focus device for performing the first operation;
  in accordance with the assigning of the first target device as the in-focus device for performing the first operation, causing the first operation to be performed by the first target device via operation of the server-implemented a common network service;
  during pendancy of the focus session with respect to the first target device:
    receiving a second voice command including a request for a second operation;
    determining that the second voice command does not include an explicit designation of a second target device;
    determining that the second operation can be performed by the first target device;
    determining whether the second voice command satisfies one or more focus session maintenance criteria; and
    in accordance with (i) a determination that the second voice command satisfies the focus session maintenance criteria, (ii) the determination that the second voice command does not include an explicit designation of a second target device, and (iii) the determination that the second operation can be performed by the first target device, maintaining the focus session with respect to the first target device, including:
      assigning the first target device as the in-focus device for performing the second operation; and
      in accordance with the assigning of the first target device as the in-focus device for performing the second operation, causing the second operation to be performed by the first target device via operation of the server-implemented common network service.

10. The electronic device of claim 9, further comprising:
receiving a fifth voice command including a predefined operation termination request;
in accordance with receiving the fifth voice command:
  causing the first operation to cease to be performed by the first target device; and
  ending the focus session with respect to the first target device.

11. The electronic device of claim 9, wherein:
the first operation is a media playback operation; and
the second operation is one of: a media stoppage operation, a media rewind operation, a media fast forward operation, a volume up operation, and a volume down operation.

12. The electronic device of claim 9, wherein:
the first operation is a device state change operation to a first state of a plurality of device states; and
the second operation is a device state change operation to a second state of the plurality of device states.

13. The electronic device of claim 9, wherein:
the first operation is a magnitude change operation in a first direction in a magnitude scale; and
the second operation is a magnitude change operation in a second direction, opposite of the first direction, in the magnitude scale.

14. The electronic device of claim 9, further comprising an array of one or more LEDs; and
the one or more programs further comprising instructions for:
  indicating a status of the focus session by illuminating one or more of the LEDs in the array of LEDs.

15. A non-transitory computer-readable storage medium storing one or more programs, the one or more programs comprising instructions, which, when executed by a first electronic device with one or more microphones, a speaker, and one or more processors, the electronic device being a member of a local group of connected electronic devices communicatively coupled to a server-implemented common network service, cause the first electronic device to perform operations of a method including:
  receiving a first voice command including a request for a first operation;
  determining a first target device for the first operation from among a local group of connected electronic devices based on content of the first voice command;
  establishing a focus session with respect to the first target device, wherein establishing a focus session with respect to the first target device includes assigning the first target device as an in-focus device for performing the first operation;
  in accordance with the assigning of the first target device as the in-focus device for performing the first operation, causing the first operation to be performed by the first target device via operation of the server-implemented a common network service;

during pendancy of the focus session with respect to the first target device:
- receiving a second voice command including a request for a second operation;
- determining that the second voice command does not include an explicit designation of a second target device;
- determining that the second operation can be performed by the first target device;
- determining whether the second voice command satisfies one or more focus session maintenance criteria; and
- in accordance with (i) a determination that the second voice command satisfies the focus session maintenance criteria, (ii) the determination that the second voice command does not include an explicit designation of a second target device, and (iii) the determination that the second operation can be performed by the first target device, maintaining the focus session with respect to the first target device, including:
  - assigning the first target device as the in-focus device for performing the second operation; and
  - in accordance with the assigning of the first target device as the in-focus device for performing the second operation, causing the second operation to be performed by the first target device via operation of the server-implemented common network service.

16. The computer-readable storage medium of claim 15, wherein:
- the focus session maintenance criteria include a criterion that the second voice command is received by the first electronic device within a first predefined time interval with respect to receiving the first voice command or with a second predefined time interval with respect to receiving the first voice command, the second predefined time interval succeeding the first predefined time interval; and
- determining whether the second voice command satisfies the one or more focus session maintenance criteria comprises determining whether the second voice command is received within any of the first predefined time interval or the predefined second time interval.

17. The computer-readable storage medium of claim 16, further comprising: in accordance with a determination that the second voice command is received within the first predefined time interval, selecting the first target device as a target device for the second voice command.

18. The computer-readable storage medium of claim 16, further comprising: in accordance with a determination that the second voice command is received within the second predefined time interval, outputting a request to confirm the first target device as a target device for the second voice command; and
- in accordance with a positive confirmation of the first target device in response to request to confirm, selecting the first target device as a target device for the second voice command.

19. The computer-readable storage medium of claim 15, wherein the first target device is the first electronic device; further comprising:
- receiving a fourth voice command including a request for a fourth operation and an explicit designation of a fourth target device among the local group of connected electronic devices, wherein the fourth target device is a third electronic device member of the local group of connected electronic devices, the third electronic device different from the first electronic device;
- maintaining the focus session with respect to the first target device;
- causing the fourth operation to be performed by the fourth target device via operation of the server-implemented common network service.

20. The computer-readable storage medium of claim 19, wherein:
- the second voice command is received after the fourth operation is caused to be performed by the fourth target device;
- the first operation is a media playback operation; and
- the second operation is a media stoppage operation; and
- the method further comprising:
  - receiving a fifth voice command including a request for a fifth operation and an explicit designation of a fifth target device among the local group of connected electronic devices, wherein the fifth target device is the third electronic device;
  - ending the focus session with respect to the first target device;
  - establishing a focus session with respect to the fifth target device; and
  - causing the fifth operation to be performed by the fifth target device via operation of the server-implemented common network service.

* * * * *